US007361829B2

(12) United States Patent
Uehara

(10) Patent No.: US 7,361,829 B2
(45) Date of Patent: Apr. 22, 2008

(54) KEYBOARD MUSICAL INSTRUMENT DISPLAYING DEPRESSION VALUES OF PEDALS AND KEYS

(75) Inventor: Haruki Uehara, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 511 days.

(21) Appl. No.: 11/077,425

(22) Filed: Mar. 10, 2005

(65) Prior Publication Data

US 2005/0204908 A1 Sep. 22, 2005

(30) Foreign Application Priority Data

Mar. 16, 2004 (JP) ............................ 2004-074031

(51) Int. Cl.
*G10H 1/32* (2006.01)
*G10H 3/00* (2006.01)
*G10H 1/00* (2006.01)
*G09B 15/00* (2006.01)
*G09B 15/02* (2006.01)

(52) U.S. Cl. ...................................... 84/746; 84/477 R

(58) Field of Classification Search .................. 84/721, 84/746, 470 R, 477 R, 478

See application file for complete search history.

(56) References Cited

U.S. PATENT DOCUMENTS 6,084,167 A * 7/2000 Akimoto et al. .......... 84/477 R
6,160,213 A * 12/2000 Arnold et al. ................ 84/615
6,388,181 B2 5/2002 Moe

FOREIGN PATENT DOCUMENTS

| | | |
|---|---|---|
| CN | 1135627 | 11/1996 |
| JP | 05-173546 | 7/1993 |
| JP | 06-027938 | 2/1994 |
| JP | 2003-255929 | 9/2003 |

* cited by examiner

*Primary Examiner*—Jeffrey Donels
(74) *Attorney, Agent, or Firm*—Harness, Dickey & Pierce, PLC

(57) ABSTRACT

A keyboard musical instrument supports lessons in practicing musical performance on a keyboard to allow users to learn musical performance expressions. In accordance with a teacher's model performance, performance data representing operations of keys of the keyboard, pedal depression data representing operations of pedals, and damper position data representing positions of dampers in action mechanisms are created and recorded on recording media such as flexible disks. When a student plays the keyboard musical instrument, the performance data, pedal depression data, and damper position data are reproduced by means of the recording media, so that they are displayed on the screen of a display, wherein the prescribed keys to be depressed are sequentially displayed in a piano roll form based on the performance data, and wherein depression values of the pedals and positions of the dampers are displayed based on the pedal depression data and damper position data.

5 Claims, 6 Drawing Sheets

KEYBOARD MUSICAL INSTRUMENT DISPLAYING DEPRESSION VALUES OF PEDALS AND KEYS

BACKGROUND OF THE INVENTION

1. Field of the Invention

This invention relates to keyboard musical instruments having fingering guidance functions, which guide users to depress keys based on performance data so that conditions and operations for manual performance on keyboards are displayed.

This application claims priority on Japanese Patent Application No. 2004-74031, the content of which is incorporated herein by reference.

2. Description of the Related Art

Conventionally, various types of technologies have been developed with regard to fingering guidance displays, which guide users to depress keys in musical performance in progress when practicing keyboard musical instruments. For example, Japanese Patent Application Publication No. H05-173546 discloses a performance guidance device for a keyboard musical instrument, in which two-colored LEDs (e.g., red and green LEDs) are arranged on the upper portion of a keyboard and are turned on to designate keys to be depressed based on musical tune data. Specifically, each key is designated by a green light just before it should be depressed; and each key is designated by a red light just at the timing at which it should be depressed, whereby it is possible to reduce delays regarding a user's manual operations with regard to the precise key-depression timing. Generally, such fingering guidance is realized by turning on LEDs, which are arranged in proximity to keys of the keyboard, thus designating keys to be depressed. Specifically, five LEDs are installed in a keyboard musical instrument so as to show the positioning of the user's five fingers on a keyboard. Alternatively, OPEN/CLOSE indicators are installed in a keyboard musical instrument so as to show the positioning of user's five fingers on a keyboard.

Japanese Patent Application Publication No. H06-27938 discloses a pedal operation display device for a piano, which is designed to cope with difficulties that players experience when directly watching pedals being operated during musical performance on a piano. Specifically, an automatic performance piano (e.g., a player piano) is equipped with a computer screen on which periods and timings for operating pedals are displayed based on performance data.

In keyboard musical instruments such as pianos, musical performance and musical expressions are greatly influenced by pedal operations and key-depression intensities (or key-touch intensities) on keys of keyboards. Therefore, it is very difficult for users to learn sophisticated musical performance and musical expressions, closely related to key-depression intensities, by merely playing keyboard musical instruments while watching fingering guidance displays for designating keys to be depressed. In addition, musical scores merely show ON/OFF symbols regarding pedals, which make it very difficult for users to learn musical performance and musical expressions using pedal operations. This problem occurs in the conventional technology disclosed in Japanese Patent Application Publication No. H06-27938, which is designed to merely indicate the timings for pedal operations.

SUMMARY OF THE INVENTION

It is an object of the invention to provide a keyboard musical instrument that displays various pieces of information regarding fingering guidance, pedal operations, and damper positions, all of which realize improvements for musical techniques and musical expressions, so as to effectively support lessons in practicing musical performance.

In a first aspect of the invention, a keyboard musical instrument is equipped with a control unit and a display, which shows a keyboard display section for displaying operation states of keys of a keyboard based on performance data indicating fingering guidance for sequentially designating keys to be depressed, and a pedal display section for displaying operation states of pedals based on pedal depression data indicating depression values of pedals to be depressed.

In the above, the depressed keys are sequentially displayed in a piano roll form, wherein note bars indicating note lengths are scrolled with respect to animated images representing the keys of the keyboard in the progression of musical performance.

In a second aspect of the invention, a keyboard musical instrument is equipped with a control unit and a display, which shows a keyboard display section for displaying operation states of keys of a keyboard based on performance data indicating fingering guidance for sequentially designating keys to be depressed, and an action display section for displaying operation states of selected parts of action mechanisms, which transmit operations of the keys to strings in the keyboard, in a time-series manner.

In the above, the selected parts are dampers for damping vibrations transmitted to the strings in the action mechanisms, so that the action display section shows positions of the dampers in the progression of musical performance.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 1:
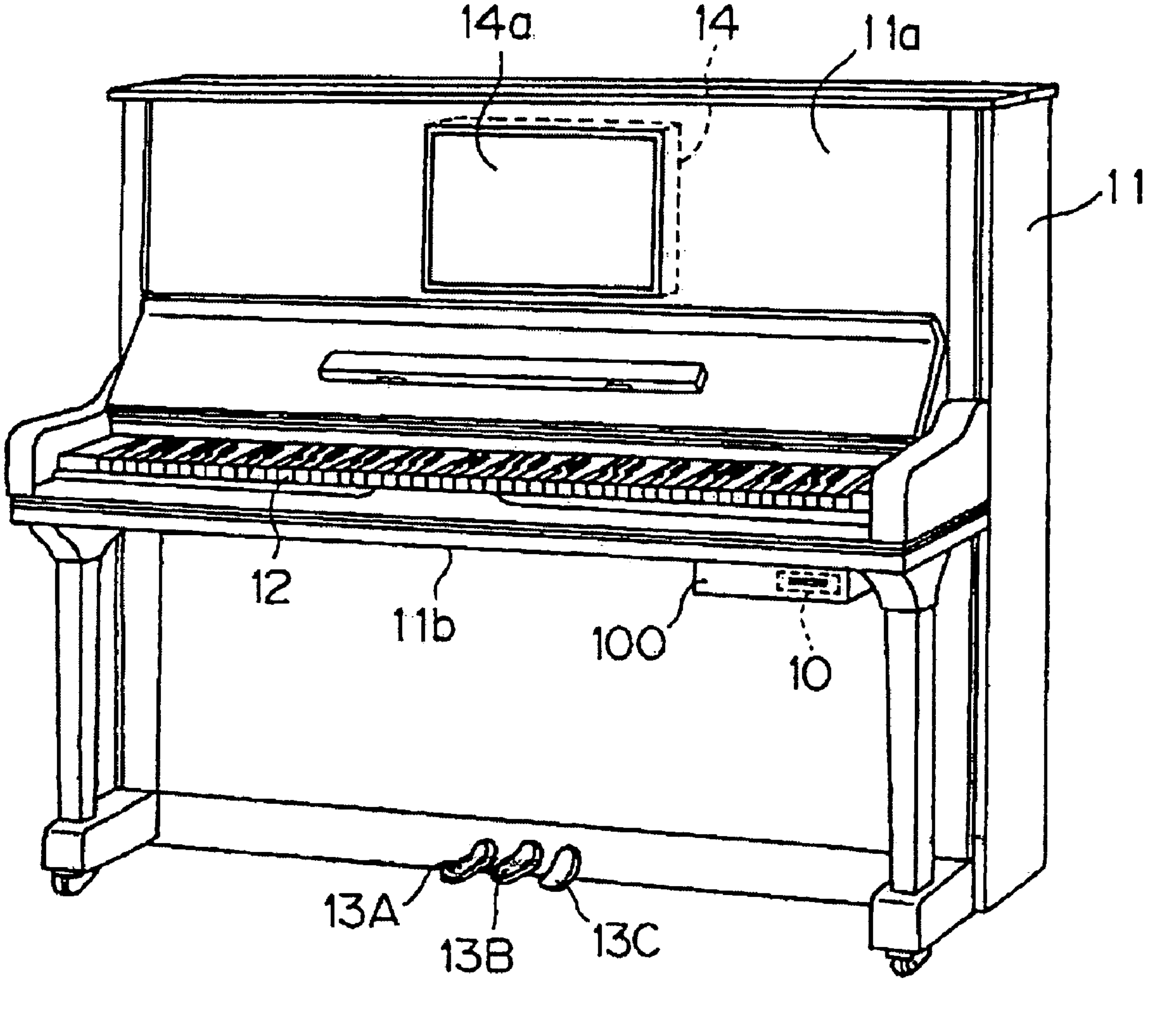
FIG. 1 is a perspective view showing the exterior appearance of a player piano in accordance with a preferred embodiment of the invention.

FIG. 1 is a perspective view showing the exterior appearance of a keyboard musical instrument in accordance with a preferred embodiment of the invention, wherein the keyboard musical instrument is an upright player piano, which has a keyboard 12 in the middle portion of a piano housing (or a casing) 11, which is equipped with a soft pedal 13A, a muffler pedal 13B, and a loud pedal 13C all arranged in the lower portion. Though the explanation will be made on the upright piano, the present invention is applicable to a grand piano. For the sake of convenience, the soft pedal 13A, muffler pedal 13B, and loud pedal 13C are collectively referred to as pedals 13. The functions of the pedals 13 are similar to those of pedals installed in conventionally known upright pianos. That is, when the soft pedal 13A is depressed, strokes of hammers are reduced in power so as to weaken the intensities in which the hammers strike strings, thus reducing the volumes of sounds. When the muffler pedal 13B is depressed, a felt muffler member (not shown) is introduced between the hammers and the strings so as to reduce striking forces applied to strings, thus reducing the volumes of sounds. When the loud pedal 13C is depressed, vibrations of strings being struck with hammers are sustained for a while so as to cause resonation of other strings, thus increasing volumes of sounds.

A screen 14*a* of a display 14 is attached to the center area of an upper front board 11*a*, which is arranged in the upper portion of the piano housing 11. The display 14 can be arranged independently of the piano housing 11. The screen 14*a* of the display is placed above a music stand (not shown), which is made on a fall board of a piano, and the center line of the screen 14*a* is roughly aligned to match the center line of the music stand. In this regard, the screen 14*a* of the display 14 may be placed on a top board of the piano. For the display 14, it is possible to use various types of displays, such as CRT displays, liquid crystal displays, and plasma displays. The position of the screen 14*a* of the display 14 is not necessarily limited to the aforementioned position aligned to match the center line of the music stand, wherein the display 14 can be placed on either side of the music stand. The display 14 is not limited to a build-in type display; hence, the display 14 can be realized by a portable display or a personal digital assistant (PDA).

A control unit 100 including a microcomputer and its peripheral circuits is arranged in the lower right side under a keybed 11*b* of the keyboard 12. The control unit 100 has a flexible disk drive (FDD) 10, which enables recording and playback (or reproduction) of musical data by use of flexible disks (e.g., floppy disks). For example, the control unit 100 is capable of recording performance data that are created by playing the player piano and is also capable of reproducing performance data that are already recorded on flexible disks so as to realize automatic performance on the player piano.

That is, the player piano of the present embodiment can serve various purposes, wherein students practice piano lessons, and teachers play model performance. When a teacher plays the keyboard 12, the player piano produces key operation data (representing keycodes, touch data, key-on events, and key-off events with regard to musical notes), pedal operation data (representing types of pedals being operated, and amounts of depressions applied to pedals), and operation state data (representing motions being detected with respect to prescribed parts of an action mechanism; specifically, in the present embodiment, damper position data), all of which are collected together to form performance data, which are recorded on a flexible disk in a prescribed format. When a flexible disk is put into the control unit 100, the player piano reproduces the teacher's performance data representing the teacher's model performance so as to realize automatic performance, according to which a student can practice piano lessons.

Based on the teacher's performance data being reproduced, the control unit 100 controls the display 14 so as to display operation states regarding the keyboard 12 and the pedals 13 as well as operation states regarding the dampers (i.e., positions of dampers) on the screen 14*a*. This allows the student to experience fingering guidance with reference to operation states of the keyboard 12. Also, the student can visually recognize operation states of pedals and dampers, which are difficult to view directly without the display 14. Thus, it is possible to realize improvements in the student's piano lessons.

In addition, the player piano can produce student's performance data regarding the student's piano practice, which can be recorded on a flexible disk. Using such a flexible disk, the player piano reproduces the student's performance data, thus realizing automatic performance and displaying various pieces of information on the screen 14*a* of the display 14. This makes it possible for the teacher to grasp the details of the student's piano practice. The player piano of the present embodiment is designed to realize two modes, which can be switched between with regard to displayed contents, i.e., a pedal display mode for displaying operation states regarding the keyboard 12 and the pedals 13, and an action display mode for displaying operation states regarding the keyboard 12 and positions of dampers.

Figure 2:
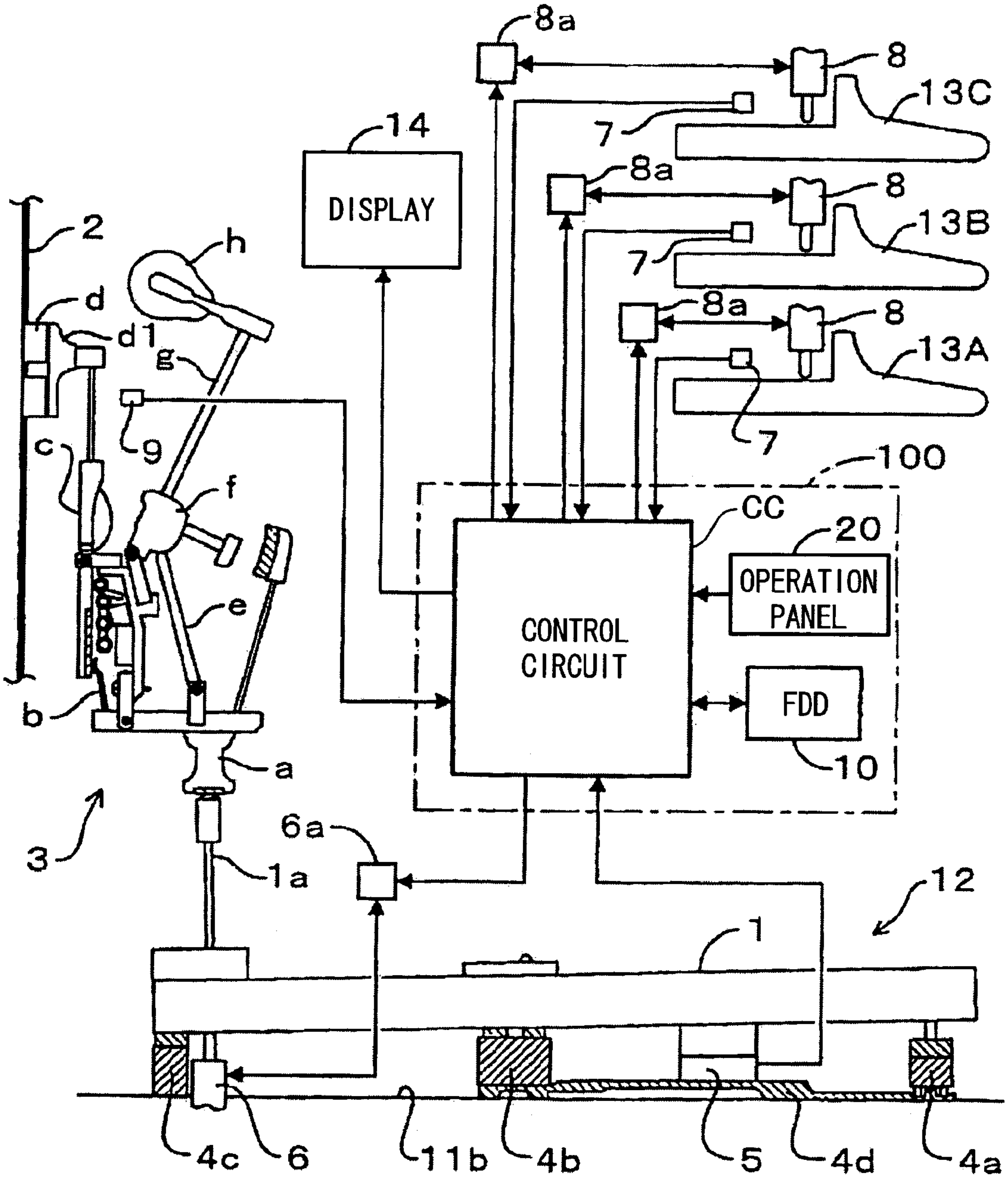
FIG. 2 is a block diagram showing hardware configurations interconnected with essential parts of a keyboard of the player piano shown in FIG. 1.

FIG. 2 is a block diagram showing hardware configurations interconnected with essential parts of the keyboard 12 of the player piano shown in FIG. 1. The following description is given with respect to a key 1 of the keyboard 12, which is a white key. Of course, a black key has a similar structure to the white key. The keyboard 12 has an action mechanism 3 that transmits the motion of the key 1 to a string (or strings) 2. A front support 4*a*, a balance support 4*b*, and a rear support 4*c* are arranged on a keybed 11*b*. The front support 4*a* and the balance support 4*b* are interconnected via a metal support assembly 4*d*. The front portion of the key is arranged above the front support 4*a*; the center portion of the key 1 is mounted on the balance support 4*b*; and the rear portion of the key 1 is mounted on the rear support 4*c*. When the front portion of the key 1 is depressed, the key 1 rotatably moves about the supporting position corresponding to the balance support 4*b* within a vertical plane in FIG. 2.

A key sensor 5 is fixed onto the metal support assembly 4*d*. The key sensor 5 detects depression of the key 1, key-depression velocity, and key-depression pressure, so as to produce a key-on signal (or a key-off signal), an initial-touch signal, and an after-touch signal. These signals are collected to form a key-depression signal, which is supplied to a control circuit CC of the control unit 100. A key solenoid 6 is arranged in proximity to the rear support 4*c*. The key solenoid 6 is driven by a servo circuit 6*a* under the control of the control circuit CC. In an automatic performance, when the key solenoid 6 is driven, the rear portion of the key 1 is lifted up so as to realize an automatic depression of the key 1, which is similar to manual depression of the key 1. For the sake of convenience, FIG. 2 shows a single group of three elements, i.e., the key sensor 5, the key solenoid 6, and the servo circuit 6*a*. Of course, these elements are arranged for each of the keys (e.g., eighty-eight keys) of the keyboard 12.

A pedal sensor 7 and a pedal solenoid 8 are arranged in proximity to each of the pedals 13A, 13B, and 13C. The pedal sensor 7 detects the depression of the corresponding pedal 13 so as to produce a pedal operation signal representing a depression value (i.e., a depression stroke), which is supplied to the control circuit CC. The pedal solenoid 8 is driven by a servo circuit 8*a* under the control of the control circuit CC, so that the corresponding pedal 13 is driven to realize an automatic depression thereof, which is similar to manual depression of the pedal 13 when depressed by a user's foot.

Similar to conventionally known action mechanisms adapted to acoustic pianos, the action mechanism 13 adapted to the player piano includes a whippen 'a', a damper spoon 'b', a damper lever 'c', a damper 'd', a jack 'e', a pad 'f', a hammer shank 'g', and a hammer 'h'. When the key 1 is manually depressed (or it is driven by the solenoid 6), a capstan 1*a* planted at the rear end portion of the key 1 presses up the whippen a so that the damper spoon b drives the lower end of the damper lever c, whereby the damper d separates from the string 2. At this time, the jack e drives the pad f so as to cause rotation with regard to the hammer shank g and the hammer h, which thus strikes the string 2.

The player piano of the present embodiment has a damper position sensor 9 for detecting the operation state of the damper d. For example, the damper position sensor 9 may be realized by a reflection-type photo sensor, which has a sensing window that is positioned opposite to the damper d with respect to the string 2 and is also positioned opposite to the backside of a damper wood d1 of the damper d. That is, when the damper d operates, the damper position sensor 9 detects a relative position of the damper d with respect to the string 2, thus producing a position detection signal, which is then supplied to the control circuit CC.

The control unit 100 includes an operation panel 20 in addition to the flexible disk drive (FDD) 10. The operation panel 20 has various operators (e.g., switches and controls) such as an operator for designating start/stop of automatic performance, an operator for designating start/stop of performance recording, and an operator for switching over the pedal display mode and action display mode as well as other operators used for settings and the like. The control circuit CC is constituted by a microcomputer, which executes control programs stored in a ROM (not shown) so as to perform various controls with regard to automatic performance, display, and read/write operations of performance data using the flexible disk drive 10.

Figure 3A:
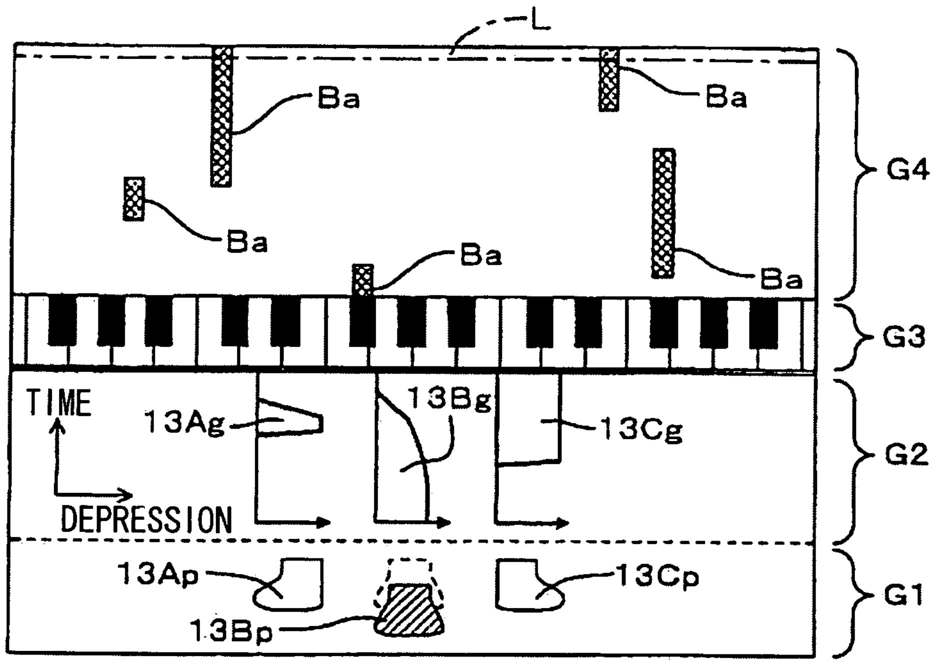
FIG. 3A shows an example of a displayed image in a pedal display mode.
Figure 3B:
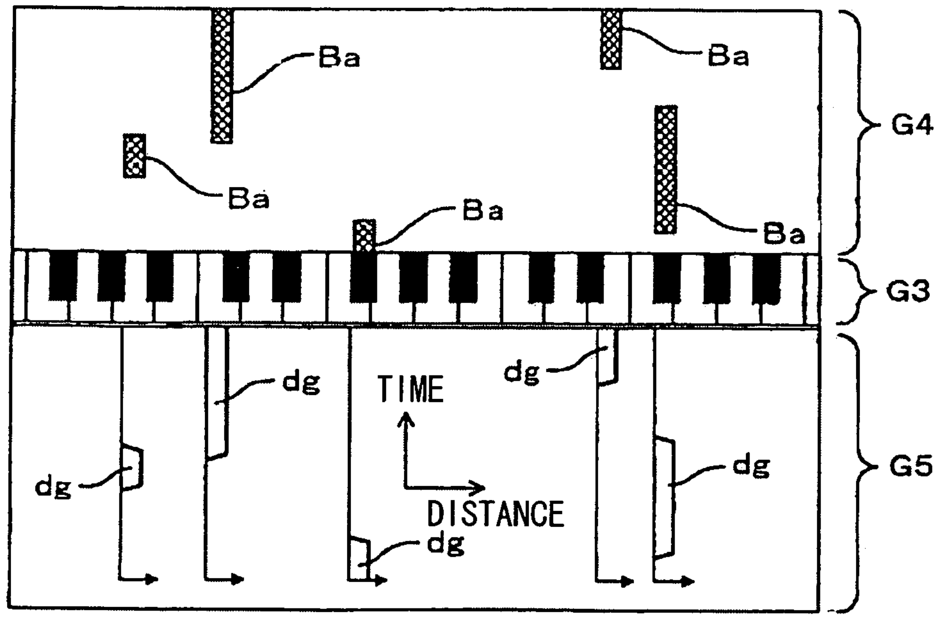
FIG. 3B shows an example of a displayed image in an action display mode.

FIGS. 3A and 3B show examples of displayed images on the screen 14*a* of the display 14. Specifically, FIG. 3A shows a displayed image in the pedal display mode; and FIG. 3B shows a displayed image in the action display mode. The displayed image of FIG. 3A regarding the pedal display mode is divided into four areas G1-G4, wherein a pedal display section consists of the areas G1 and G2, and a keyboard display section consists of the areas G3 and G4. The area G1 shows animations representing the three pedals 13 illustrated in plan view; specifically, three animations 13Ap, 13Bp, and 13Cp are displayed in correspondence with the soft pedal 13A, the muffler pedal 13B, and the loud pedal 13C respectively. In FIG. 3A, it shows a pedal operation state in which the soft pedal 13A and the loud pedal 13C are not depressed, but the muffler pedal 13B (represented by the animation 13Bp) is depressed. Each of the animations 13Ap, 13Bp, and 13Cp are vertically deviated in position so as to show a depression value thereof. The animations 13Ap, 13Bp, and 13Cp are varied in response to operations of the pedals 13 in the progression of automatic performance. The area G2 shows graphs 13Ag, 13Bg, and 13Cg that are displayed to show depression values of the pedals 13A, 13B, and 13C with respect to time, wherein the horizontal axis represents the depression value, and the vertical axis represents time. Herein, curves or lines drawn in the graphs show time-related variations of depression values with respect to the pedals 13. In addition, the graphs 13Ag, 13Bg, and 13Cg are collectively scrolled downwards in the progression of automatic performance.

The animations 13Ap, 13Bp, and 13Cp are not necessarily displayed and controlled in response to the automatic performance, and they can be displayed and controlled in response to outputs of the pedals 13, which allows pedal operations of the teacher's model performance to be visually recognized on the screen 14*a* of the display 14.

The area G3 shows a schematic pattern of the keyboard 12 of the player piano; and area G4 shows note bars Ba, which form displayed elements of fingering guidance, in a piano roll form. Such a piano roll display is similar to conventionally known piano roll displays for displaying contents of performance data, wherein note bars Ba sequentially move downwards from the top to the bottom in the area G4 in accordance with the progression of automatic performance, and they designate keys to be depressed, which are displayed just below them in the area G3. When the lower end of the note bar Ba moves down to match the bottom of the area G4, it shows the key-depression timing with regard to the corresponding key. In addition, note bars Ba whose lower ends do not match the bottom of the area G4 notify a user of key-depression timings of the corresponding keys in advance. Furthermore, the length of the note bar Ba designates a time length ranging from the key-on timing to the key-off timing.

The present embodiment performs processing regarding the piano roll display, as follows:

First, when performance data subjected to automatic performance are selected (or designated), the microcomputer analyzes and extracts a prescribed amount of performance data belonging to a prescribed time length, which corresponds to the vertical width of the area G4 on the screen 14*a* of the display 14, so that all note bars belonging to the prescribed time length in the automatic performance are displayed in the area G4. When an interrupt occurs in the processing of the automatic performance that is started, a line L for a single scroll operation is copied to the top position of the area G4, and all note bars displayed thereunder are scrolled by one line. Herein, each note bar Ba is displayed in the form of a rectangular segment, which is constituted by pixels representing the corresponding note length and pixels representing the width of the corresponding key displayed in the area G3. Based on performance data corresponding to the timing (hereinafter, referred to as "display timing"), which is subsequent to the interrupt timing of the automatic performance (hereinafter, referred to as "present timing") by the prescribed time length corresponding to the height of the area G4, segments of note bars corresponding to note-on events are displayed in relation to the line L displayed at the top position of the area G4, but segments of note bars corresponding to note-off events are erased from the area G4. The aforementioned process is repeatedly performed every time an interrupt occurs in the processing of the automatic performance. Thus, note bars Ba are scrolled downwards in the area G4 in accordance with the progression of the automatic performance.

In the action display mode shown in FIG. 3B, the display 14 displays areas G3-G5 on the screen 14*a*, wherein an action display section corresponds to the area G5, and a keyboard display section consists of the areas G3 and G4. The area G5 shows graphs dg, each of which shows time-related variations of the position of the damper d of the corresponding key 1. In the graphs dg, the horizontal axis represents the distance between the string 2 and the damper d, and the vertical axis represents time. Hence, curves or lines of the graphs dg show time-related variations of distances with respect to the corresponding keys. These graphs dg are collectively scrolled downwards in the progression of the automatic performance.

Next, detailed descriptions will be given with respect to the graphs 13Ag, 13Bg, and 13Cg, which are displayed in the area G2 shown in FIG. 3A, and the graphs dg, which are displayed in the area G5 shown in FIG. 3B.

Pedal depression data representing depression values, which are applied to the pedals 13 and are detected by the pedal sensors 7, and damper position data representing positions of the dampers d, which are detected by the damper position sensors 9, are recorded in correspondence with prescribed clock timings of performance data. When an interrupt occurs in the processing of the automatic performance, the aforementioned graphs are created based on performance data corresponding to the prescribed time length between the present timing (corresponding to the interrupt timing) and the display timing, whereby they are written over in the areas G2 and G5 respectively. As a result, the graphs 13Ag, 13Bg, and 13Cg, and the graphs dg are sequentially scrolled downwards in the progression of the automatic performance. In order to avoid interference between displayed regions between adjacent key regions on the screen 14*a*, the graphs dg are displayed in the area G5 only with respect to note-on events.

Figure 4:
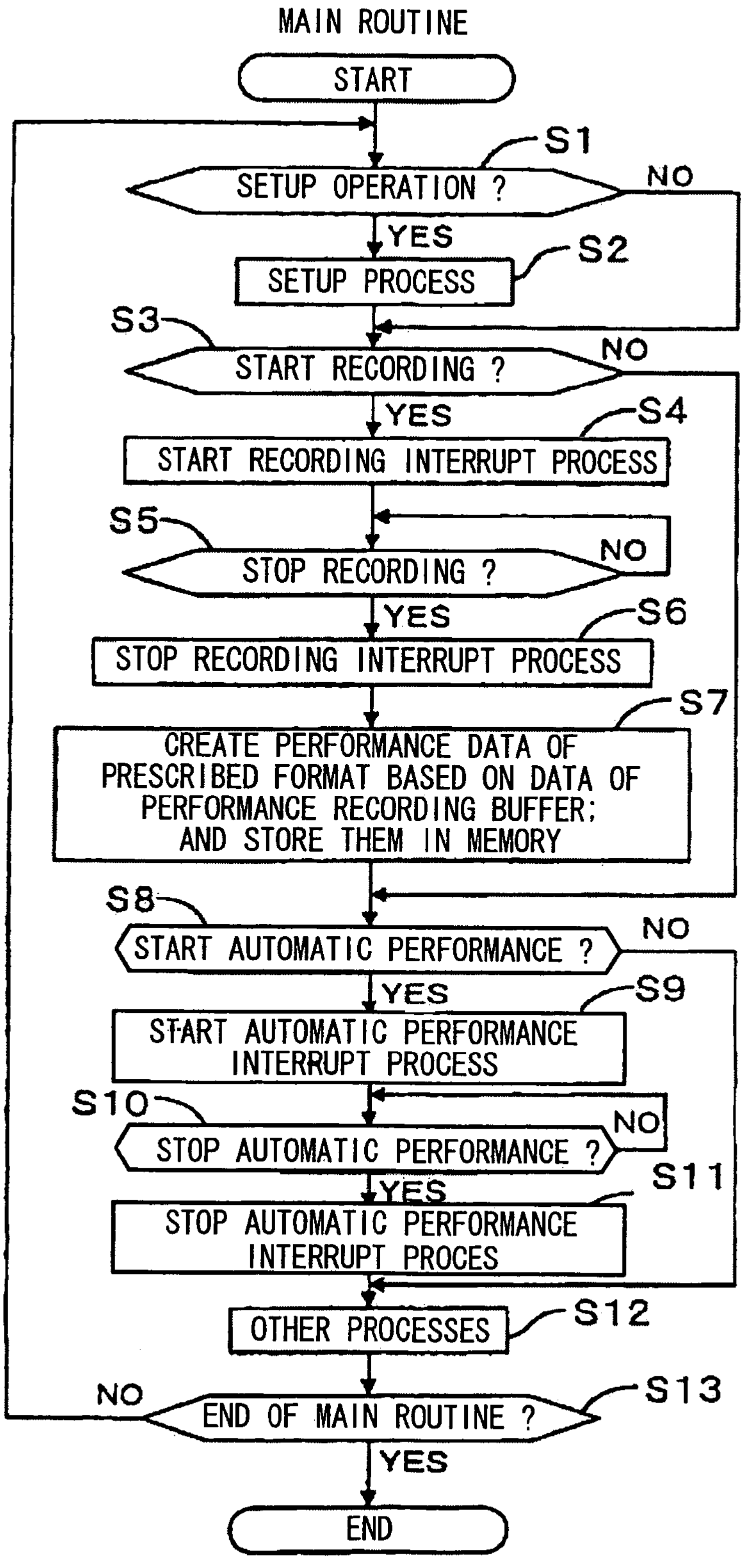
FIG. 4 is a flowchart showing a main routine of a control program executed by a microcomputer installed in the player piano.
Figure 5:
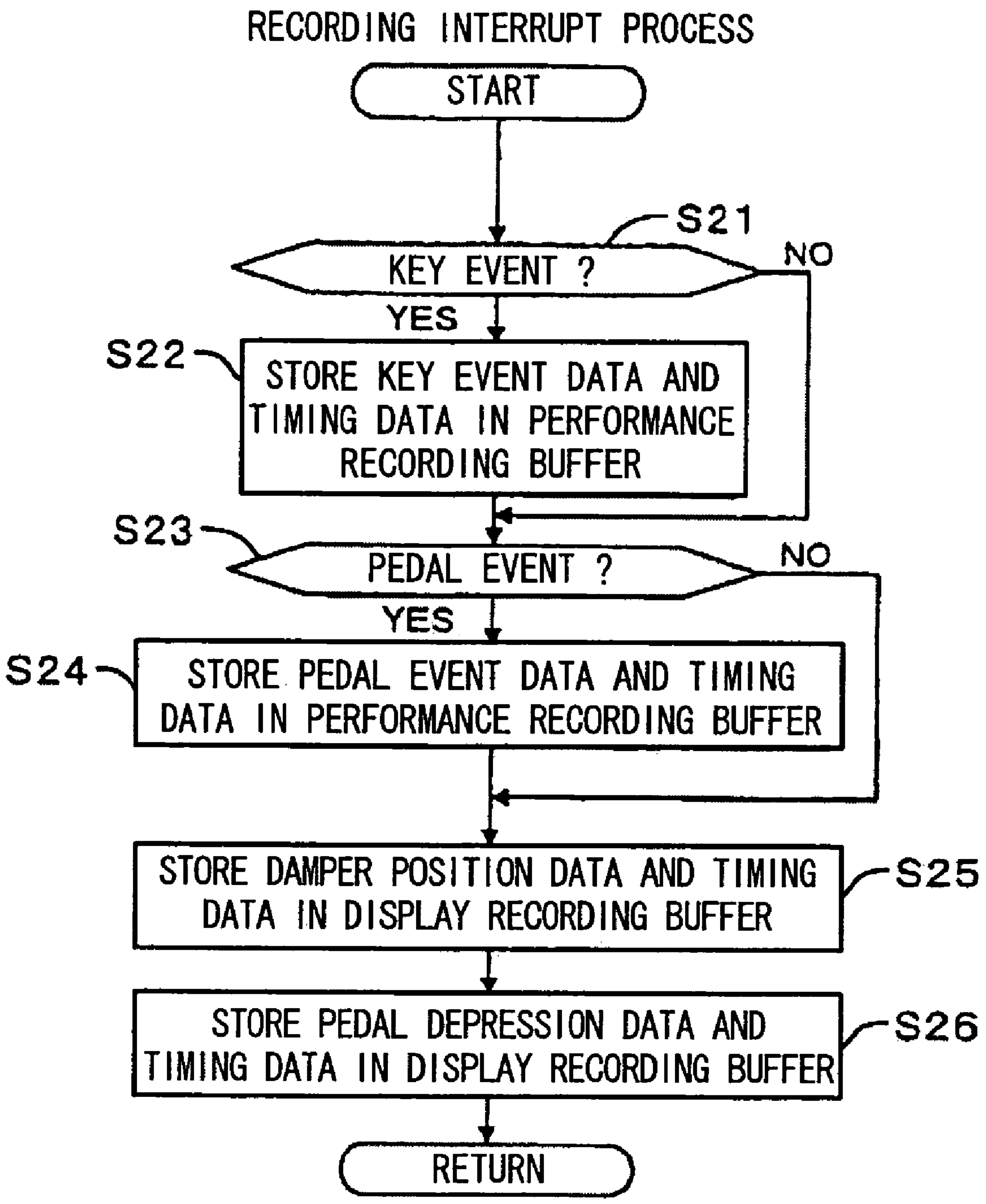
FIG. 5 is a flowchart showing a recording interrupt process incorporated in the main routine shown in FIG. 4.
Figure 6:
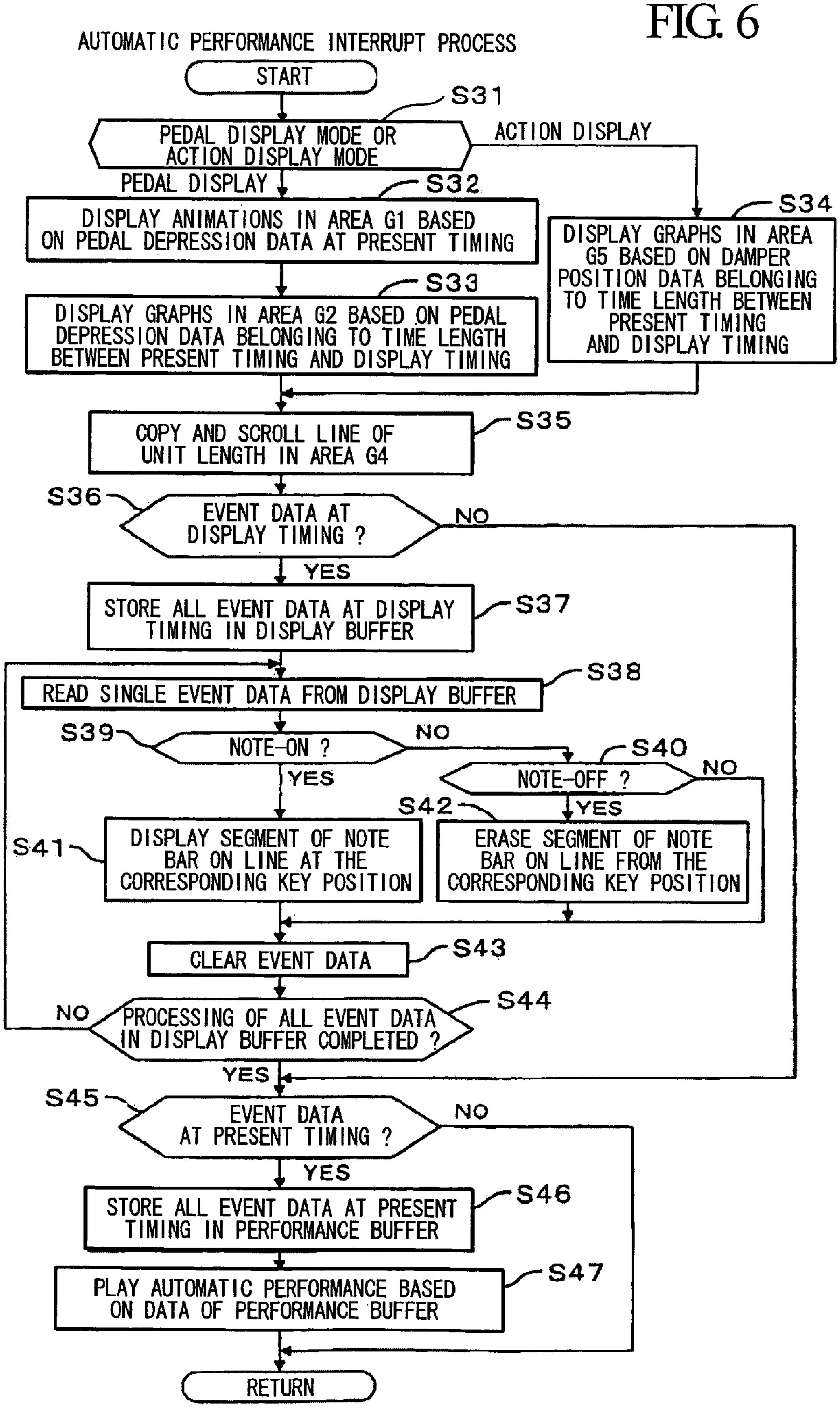
FIG. 6 is a flowchart showing an automatic performance interrupt process incorporated into the main routine shown in FIG. 4.

Next, details of the controlling and processing adapted to the player piano of the present embodiment will be described with reference to FIGS. 4 to 6. FIG. 4 is a flowchart showing a main routine of control programs; FIG. 5 is a flowchart showing a recording interrupt process; and FIG. 6 is a flowchart showing an automatic performance interrupt process. The main routine shown in FIG. 4 mainly describes the processing for the operation panel 20, wherein step S1 is related to setup operation in which a decision is made as to whether or not a setup operation is made by a user of the player piano. If "NO", the flow proceeds to step S3. If "YES", the flow proceeds to step S2 in which the microcomputer performs setup processes corresponding to various setup operations made by the user; then, the flow proceeds to step S3. In the setup process, for example, the microcomputer selectively sets either a left register or a right register (because all the keys of the keyboard 12 are divided into two groups, i.e., right and left registers) with respect to the areas G3, G4, and G5 on the screen 14*a*. Herein, a desired register is selected in response to a musical tune subjected to automatic performance and is selectively displayed on the screen 14*a*. Alternatively, in response to phrases of a musical tune being practiced, a desired register is selectively displayed on the screen 14*a* but another register that is not used in practice is not displayed on the screen 14*a*. That is, a prescribed display area is automatically selected with respect to keys of the keyboard 12 divided into right and left registers. Thus, it is possible to effectively use the limited width of the screen 14*a*, which can display a limited number of keys. Such a display area can be automatically detected in response to automatic performance and keys actually played by users, for example. Incidentally, the setup process allows the pedal display mode and action display mode to be switched over, and it allows a tempo of a musical tune to be set up.

In step S3, a decision is made as to whether or not recording is started in response to an operation event regarding a recording start/stop operator. If recording is not started, the flow directly proceeds to step S8. If recording is started, the flow proceeds to step S4 for starting a recording interrupt process; then, the flow proceeds to step S5, whereby it is possible to start the recording interrupt process shown in FIG. 5 at the prescribed interrupt timing corresponding to the tempo that is manually or automatically set up. In step S5, the microcomputer monitors whether the recording is to stop in response to an operation event regarding the recording start/stop operator. The present embodiment is designed to neglect operation events regarding other operators in the operation panel 20 during the recording of performance data until the recording is stopped. When the recording is stopped, the microcomputer stops the recording interrupt process in step S6; then, the flow proceeds to step S7. In step S7, the microcomputer creates performance data of a prescribed format based on previous data that are stored in a performance recording buffer (not shown) in the recording interrupt process; then, it writes them into memory (e.g., internal RAM). Thereafter, the flow proceeds to step S8.

In step S8, a decision is made as to whether or not automatic performance is started in response to an operation event regarding an automatic performance start/stop operator. If the automatic performance is not started, the flow directly proceeds to step S12. If the automatic performance is started, the flow proceeds to step S9 for starting the automatic performance interrupt process; then, the flow proceeds to step S10. As a result, it is possible to start the automatic performance interrupt process shown in FIG. 6 at the prescribed interrupt timing corresponding to the tempo that is automatically or manually set up. In step S10, the microcomputer monitors whether the automatic performance is to stop in response to an operation event regarding the automatic performance start/stop operator. In this case, the microcomputer neglects operation events regarding other operators in the automatic performance until the automatic performance is stopped. When the automatic performance is stopped, the flow proceeds to step S11 for stopping automatic performance interrupt process; then, the flow proceeds to step S12. In step S12, the microcomputer performs other processes. In step S13, a decision is made as to whether or not the main routine is terminated in response to a power switch (not shown) being turned off. If not, the flow reverts to step S1. In step S13, the microcomputer adds file names and titles of musical tunes to performance data, which are created and recorded in advance, so that the performance data are written into flexible disks, for example.

In the recording interrupt process shown in FIG. 5, the flow firstly proceeds to step S21 in which a decision is made as to whether or not a key event (i.e., a key-on/off event) occurs in the keyboard 12. If no key event occurs, the flow directly proceeds to step S23. When a key event occurs, the flow proceeds to step S22 in which the corresponding key event data are stored in the performance recording buffer together with the timing data thereof; then, the flow proceeds to step S23. In step S23, a decision is made as to whether or not a pedal event (i.e., a pedal on/off event) occurs in any one of the pedals 13. If not pedal event occurs, the flow directly proceeds to step S25. When a pedal event occurs, the flow proceeds to step S24 in which the corresponding pedal event data are stored in the performance recording buffer together with the timing data thereof; then, the flow proceeds to step S25. In step S25, damper position data, which are produced by the damper position sensor 9, are stored in a display recording buffer together with the timing data thereof. In step S26, pedal depression data, which are produced by the pedal sensor 7 in response to a depression value adapted to the pedal 13, are stored in the display recording buffer together with the timing data thereof.

Thereafter, the flow reverts to the original routine, i.e., the main routine shown in FIG. 4.

According to the recording interrupt process described above, performance data are sequentially stored in the performance recording buffer; and damper position data and pedal depression data are sequentially stored in the display recording buffer. When the recording is ended, performance data of the prescribed format are created in step S7 shown in FIG. 4. That is, performance data are created in accordance with the user's piano play on the player piano. For example, performance data are created in response to the teacher's model performance and are recorded on a flexible disk, which is transferred to some student, who in turn operates the player piano to play automatic performance based on the performance data. Alternatively, performance data are created in response to the student's model performance and are recorded on a flexible disk, which is transferred to some teacher, who in turn operates the player piano to play automatic performance based on the performance data, whereby the teacher can check the student's performance.

In the automatic performance interrupt process shown in FIG. 6, the microcomputer proceeds to reproduction of automatic performance based on performance data and display controls shown in FIGS. 3A and 3B. In step S31, a decision is made as to whether the pedal display mode or the action display mode is selected. In the pedal display mode, the animations 13Ap, 13Bp, and 13Cp regarding operation states of the pedals 13A, 13B, and 13C are displayed in the area G1 on the basis of pedal depression data at the present timing in step S32. In step S33, the pedal depression graphs 13Ag, 13Bg, and 13Cg are displayed in the area G2 on the basis of pedal depression data belonging to the prescribed time length ranging from the present timing to the display timing. After completion of step S33, the flow proceeds to step S35. In the action display mode, the flow proceeds to step S34 in which the damper position graphs dg are displayed in the area G5 on the basis of damper position data corresponding to the time length between the present timing and the display timing. After completion of step S34, the flow proceeds to step S35.

In step S35, the line L having a unit length is copied so that all images thereunder are scrolled downwards in the area G4. In step S36, a decision is made as to whether or not event data exist at the display timing (that is a prescribed time after the present timing). If no event data exists at the display timing, the flow directly proceeds to step S45. When event data exist at the display timing, the flow proceeds to step S37 in which all event data at the display timing are stored in a display buffer (not shown); then, the flow proceeds to step S38. Steps S38 to S44 are directed to updating one-line display operation regarding all event data of the display buffer at the display timing. Specifically, in step S38, single event data is read out; then, in steps S39 and S40, a decision is made as to whether or not the read event data is related to a note-on event or a note-off event. In the case of a note-on event, the flow proceeds to step S41 in which a segment of a single note bar is displayed on the line at a prescribed position of the corresponding key in which the note-on event occurs. In the case of a note-off event, the flow proceeds to step S42 in which a segment of a single note bar is erased and not displayed on the line at a prescribed position of the corresponding key in which the note-off event occurs. In step S43, data regarding the note-on/off event is cleared from the display buffer; then, the flow proceeds to step S44. The aforementioned processing is repeatedly performed with respect to all events. When the processing is completed with respect to all events, the decision result of step S44 turns to "YES", so that the flow proceeds to step S45. Thus, it is possible to update all data regarding one line in the piano roll display.

In step S45, a decision is made as to whether or not event data exist at the present timing. When event data exist, the flow proceeds to step S46 in which all event data at the present timing are stored in a performance buffer (not shown). In step S47, an automatic performance is played based on event data of the performance buffer. Thereafter, the flow reverts to the original routine, i.e., the main routine shown in FIG. 4.

According to the automatic performance interrupt process described above, the displayed contents are updated so as to play automatic performance on the basis of event data at the present timing and event data belonging to the prescribed time length between the present timing and the display timing. Thus, the displayed contents are scrolled vertically in the progression of the automatic performance.

The present embodiment provides the pedal display mode for displaying operation states of the pedals 13 and the action display mode for displaying damper positions in the action mechanism 3, which are switched over. Of course, it is possible to provide either the pedal display mode or the action display mode.

In the present embodiment, operation states of the pedals 13 are displayed as the animations 13Ap, 13Bp, and 13Cp in the area G1 on the screen 14*a*. Of course, it is possible to pickup real images of pedals being operated by use of a video camera and the like, so that real images of pedals are actually displayed on the screen 14*a* of the display 14. In the present embodiment, operation states of dampers of the action mechanism 3 are displayed as damper position graphs dg in the area G5 on the screen 14*a*. Of course, it is possible to modify the present embodiment such that operation states of other parts of the action mechanism 3 and the like are displayed on the screen 14*a* of the display 14.

In addition, performance data to be recorded on flexible disks are not necessarily created in response to model performance played by a specifically designated teacher. That is, it is possible to use 'general' performance data (such as performance data representing model performance played by a professional or prominent player) suited to the prescribed format adapted to the keyboard of the player piano, for example. Of course, it is possible to use various recording media for recording performance data other than flexible disks.

For example, a plurality of player pianos (or keyboard musical instruments having control units) are connected together via MIDI cables (where "MIDI" stands for "Musical Instrument Digital Interface" standard) or LANs (i.e., local area networks) so as to form musical systems, which are provided in piano lesson rooms and the like. Herein, performance data can be transferred from one player piano to the other player piano, thus realizing piano lessons between teachers and students. Alternatively, a plurality of player pianos (or keyboard musical instruments having control units), which allow teachers and students to play, are connected together via networks such as the Internet, thus realizing remote piano lessons between them.

This invention is not necessarily limited to the present embodiment that is directed to the player piano. That is, this invention can be applied to other types of keyboard musical instruments such as electronic pianos that are not equipped with automatic drive functions with regard to keyboards and pedals.

The present embodiment realizes fingering guidance by means of the piano roll display using note bars. Instead of using note bars displayed on the screen of the display, it is possible to use other symbols or marks, which designate keys to be depressed and which are displayed in the area G4 just above the keys of the keyboard displayed in the area G3. In this case, symbols or marks can be changed in colors before and after key-depression timings. Alternatively, they can be changed in vertical positions thereof on the screen of the display.

The keyboard display section is positioned appropriately on the screen of the display, wherein the displayed position thereof can be adjusted to match the upper/lower sides of the screen or the left/right sides of the screen, for example. When it is positioned to match the left/right sides of the screen, the keys of the keyboard are scrolled horizontally. In the horizontal scrolling, the keys of the keyboard are scrolled such that the designated keys (or designated register) gradually move away from the screen, or they gradually move into the screen, for example.

This invention is not necessarily limited to the present embodiment in which the area G4 displays scroll bars (i.e., note bars) having vertically elongated rectangular shapes representing note lengths ranging from key-on timings to key-off timings, which are displayed in correspondence with keys corresponding to note-on events. Instead of using scroll bars, it is possible to use other symbols or icons, which are positioned in correspondence with keys, which are turned on and off at key-on timings and key-off timings, and which are changed in colors in response to velocities, for example. That is, any types of symbols or icons indicating operations of keys can be adapted to keyboard musical instruments according to this invention.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A keyboard musical instrument comprising:

a display divided into first and second display sections;

the first display section comprising a keyboard display section for displaying operation states of keys of a keyboard;

the second display section comprising a mode-selectable display that alternately displays (a) an action display for providing a visual representation of keyboard action and (b) a pedal display section for displaying operation and depression of pedals; and a control device for controlling the keyboard display section to display the operation states of the keys of the keyboard based on performance data representing the keys of the keyboard to be sequentially depressed, and for controlling the pedal display section to display the operation states of the pedals based on pedal depression data representing depression values of the pedals.

2. A keyboard musical instrument according to claim 1, wherein the performance data are created to indicate fingering guidance for sequentially designating the keys to be depressed.

3. A keyboard musical instrument comprising:

a keyboard display section for displaying operation states of keys of a keyboard;

an action display section for displaying relative positions of selected parts of action mechanisms including intermediate positions, which transmit operations of the keys to strings in action mechanisms; and a control device for controlling the keyboard display section to display the operation states of the keys of the keyboard based on performance data representing keys of the keyboard to be sequentially depressed, and for controlling the action display section to display the operation states of the selected parts of the action mechanisms in a time-series manner.

4. A keyboard musical instrument according to claim 3, wherein the performance data are created to indicate fingering guidance for sequentially designating the keys to be depressed.

5. A keyboard musical instrument according to claim 3, wherein the selected parts of the action mechanisms are dampers for damping vibrations transmitted to the strings in the action mechanisms, so that the action display section displays positions of the dampers in a progression of a musical performance.

* * * * *